(12) United States Patent
Glaser et al.

(10) Patent No.: US 12,712,863 B2
(45) Date of Patent: Aug. 18, 2026

(54) SYSTEM AND METHOD FOR ADAPTIVE FORMAT CONFIGURATION IN SECURE DATA TRANSMISSION

(71) Applicant: NVIDIA CORPORATION, Santa Clara, CA (US)

(72) Inventors: Stephen David Glaser, San Francisco, CA (US); Jonathon Evans, Santa Clara, CA (US); Vidhya Krishnan, Folsom, CA (US); Naveen Kumar Narrishetti, Bengaluru (IN); Peter Paneah, Nesher (IL); Vladimir Vainer, Kiryat Shmona (IL); Ariel Shahar, Jerusalem (IL); Ofir Even Chen, Kfar Saba (IL)

(73) Assignee: NVIDIA Corporation, Santa Clara, CA (US)

( * ) Notice: Subject to any disclaimer, the term of this patent is extended or adjusted under 35 U.S.C. 154(b) by 16 days.

(21) Appl. No.: 18/809,586

(22) Filed: Aug. 20, 2024

(65) Prior Publication Data

US 2025/0119413 A1 Apr. 10, 2025

Related U.S. Application Data

(60) Provisional application No. 63/542,449, filed on Oct. 4, 2023.

(51) Int. Cl.
*H04L 29/06* (2006.01)
*H04L 9/40* (2022.01)

(52) U.S. Cl.
CPC ........ *H04L 63/0485* (2013.01); *H04L 63/166* (2013.01)

(58) Field of Classification Search
CPC .......................... H04L 63/0485; H04L 63/166
See application file for complete search history.

(56) References Cited

U.S. PATENT DOCUMENTS 11,817,904 B2 11/2023 Nielsen et al.
11,921,662 B2 3/2024 Levi et al.
(Continued)

OTHER PUBLICATIONS

Weiner et al., Pending U.S. Appl. No. 18/943,347, filed Nov. 11, 2024.
(Continued)

*Primary Examiner* — Wasika Nipa
(74) *Attorney, Agent, or Firm* — Schwegman Lundberg & Woessner, P.A.

(57) ABSTRACT

Systems, computer program products, and methods are described for secure data transmission. An example system includes a first end-point device, an intermediate device, and a second-end point device. The first end-point device determines the format requirements of the communication link between the first end-point device and the intermediate device, and the communication link intermediate device and the second end-point device. Based on the format requirements, the first end-point device configures the data packet for transmission, such that the data packet, when received at the intermediate device, is re-configured and routed to the second end-point device. When the second end-point device receives the data packet, it verifies the data packet to confirm that the packet has maintained its integrity throughout transit.

20 Claims, 5 Drawing Sheets

(56) References Cited

U.S. PATENT DOCUMENTS

| | | | | |
|---|---|---|---|---|
| 2014/0143855 | A1* | 5/2014 | Keoh | H04L 63/123 726/14 |
| 2021/0255973 | A1* | 8/2021 | Harriman | G06F 13/20 |

OTHER PUBLICATIONS

Patki et al., Pending U.S. Appl. No. 18/372,773, filed Sep. 26, 2023.

Glaser et al., Pending U.S. Appl. No. 18/894,919, filed Sep. 24, 2024.

* cited by examiner

SYSTEM AND METHOD FOR ADAPTIVE FORMAT CONFIGURATION IN SECURE DATA TRANSMISSION

CROSS-REFERENCE TO RELATED APPLICATIONS

This application claims priority to U.S. Application No. 63/542,449, filed Oct. 4, 2023, the content of which is hereby incorporated by reference in its entirety.

TECHNOLOGICAL FIELD

Example embodiments of the present invention relate to a system for secure data transmission.

BACKGROUND

High-speed interconnects such as Peripheral Component Interconnect Express (PCIe) and Compute Express Link (CXL) fuel data-driven applications but also raise security concerns. The Integrity and Data Encryption (IDE) mechanism within such high-speed interconnect fabrics secures data transmission by encrypting data packets. However, current limitations restrict flexible transmission modes, causing complexity and hindering system performance. The challenge arises when data needs to switch between transmission modes, leading to translation errors for encrypted packets.

Applicant has identified a number of deficiencies and problems associated with secure data transmission using high-speed interconnect technologies. Many of these identified problems have been solved by developing solutions that are included in embodiments of the present disclosure, many examples of which are described in detail herein.

BRIEF SUMMARY

Systems, methods, and computer program products are therefore provided for secure data transmission.

In one aspect, a system for secure data transmission is presented. The system comprising: a first end-point device, wherein the first end-point device is configured to: configure a data packet for transmission based on characteristics of a first communication link, wherein the first communication link is configured to facilitate data transmission in a first transmission format; and transmit the data packet via the first communication link; an intermediate device operatively coupled to the first end-point device via the first communication link, wherein the intermediate device is configured to: receive the data packet; re-configure the data packet for transmission based on characteristics of a second communication link associated with the intermediate device, wherein the second communication link is configured to facilitate data transmission in a second transmission format; and transmit the data packet via the second communication link; and a second end-point device operatively coupled to the intermediate device via the second communication link, wherein the second end-point device is configured to: receive the data packet.

In some embodiments, the first end-point device, in configuring the data packet for transmission, is further configured to: determine that the first communication link is configured to facilitate data transmission in the first transmission format and the second communication link is configured to facilitate data transmission in the second transmission format; and in response to determining that the first communication link is configured to facilitate data transmission in the first transmission format and the second communication link is configured to facilitate data transmission in the second transmission format, initially configure the data packet in the second transmission format; encrypt the data packet; convert the encrypted data packet from the second transmission format to the first transmission format; and transmit the encrypted data packet via the first communication link in the first transmission format.

In some embodiments, the first transmission format is flit mode format, and the second transmission format is a non-flit mode format.

In some embodiments, the first end-point device is configured to encrypt the data packet using an integrity and data encryption (IDE) mechanism.

In some embodiments, the first end-point device, in encrypting the data packet, is further configured to: generate a transmitted message authentication code (MAC) for the encrypted data packet based on at least packet components associated with the data packet and an encryption key associated with the IDE mechanism; and embed the transmitted MAC within the encrypted data packet.

In some embodiments, the first end-point device, in converting the encrypted data packet, is further configured to: convert the transmitted MAC embedded within the encrypted packet from the second transmission format to the first transmission format.

In some embodiments, the intermediate device, in re-configuring the data packet for transmission, is further configured to: receive, from the first end-point device, the encrypted data packet in the first transmission format; convert the encrypted data packet from the first transmission format to the second transmission format; and transmit the encrypted data packet via the second communication link in the second transmission format.

In some embodiments, the intermediate device, in converting the encrypted packet, is further configured to: convert the transmitted MAC embedded within the encrypted packet from the first transmission format to the second transmission format.

In some embodiments, the second end-point device is further configured to: receive, from the intermediate device, the encrypted data packet in the second transmission format; generate a recomputed MAC for the received encrypted data packet based on at least the packet components associated with the data packet and the encryption key associated with the IDE mechanism; determine whether the recomputed MAC matches the transmitted MAC embedded in the encrypted data packet; and in an instance in which the recomputed MAC matches the transmitted MAC embedded in the encrypted data packet, acknowledge an integrity of the data packet.

In some embodiments, the first communication link and the second communication link are associated with high-speed interconnect technologies, and wherein the data packet is a transport layer packet (TLP).

In another aspect, a method for configuring a data packet is presented. The method comprising: determining that a first communication link is configured to facilitate data transmission in a first transmission format and a second communication link is configured to facilitate data transmission in a second transmission format; and in response to determining that the first communication link is configured to facilitate data transmission in the first transmission format and the second communication link is configured to facilitate data transmission in the second transmission format, initially configuring a data packet in the second transmission format;

encrypting the data packet; converting the encrypted data packet from the second transmission format to the first transmission format; and transmitting the encrypted data packet via the first communication link in the first transmission format.

In yet another aspect, a computer program product for configuring a data packet is presented. The computer program product comprising a non-transitory computer-readable medium comprising instructions, when executed by a processor, cause a device to: determine that a first communication link is configured to facilitate data transmission in a first transmission format and a second communication link is configured to facilitate data transmission in a second transmission format; and in response to determining that the first communication link is configured to facilitate data transmission in the first transmission format and the second communication link is configured to facilitate data transmission in the second transmission format, initially configure a data packet in the second transmission format; encrypt the data packet; convert the encrypted data packet from the second transmission format to the first transmission format; and transmit the encrypted data packet via the first communication link in the first transmission format.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
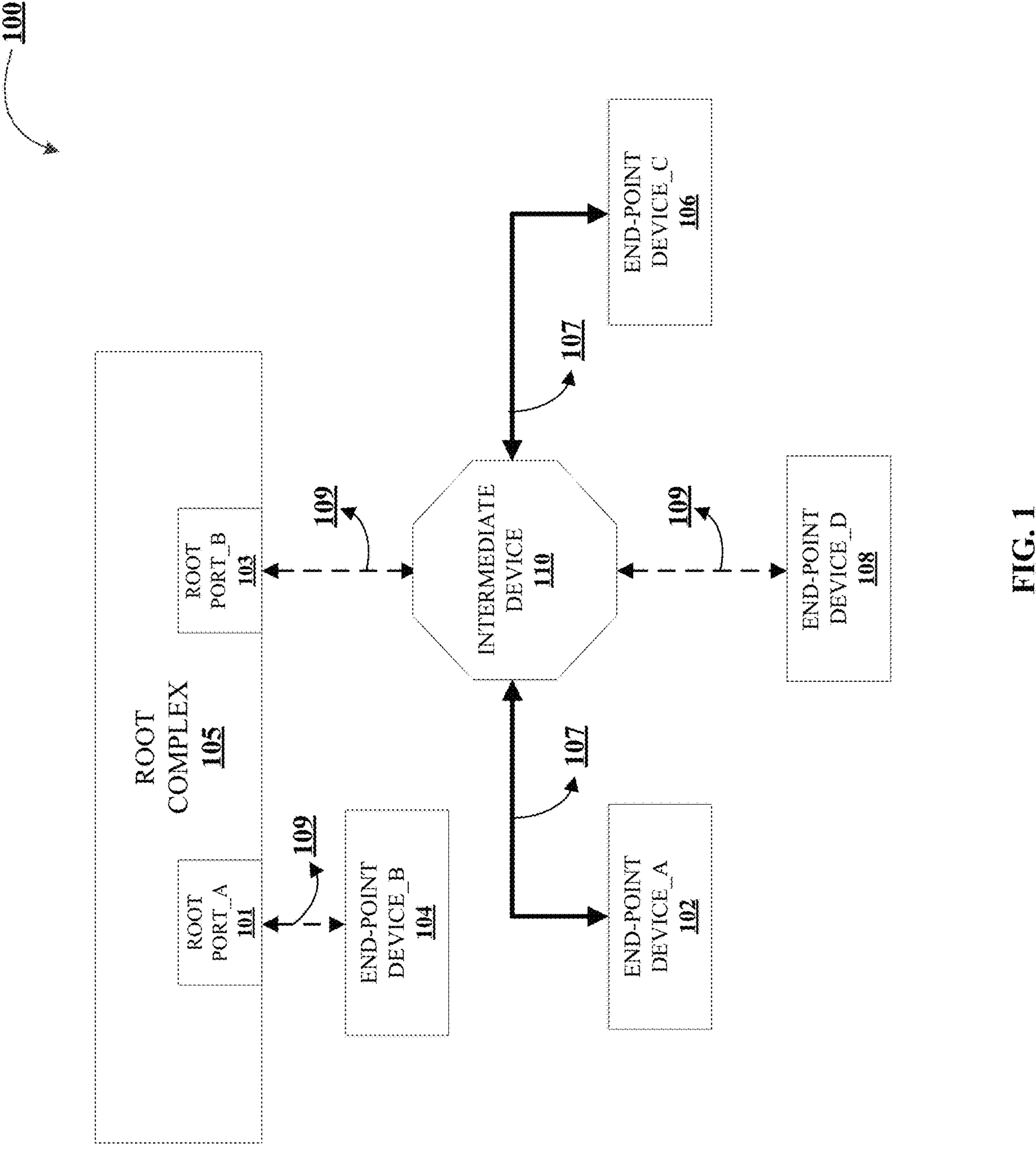
FIG. 1 illustrates an example system environment for secure data transmission, in accordance with an embodiment of the present invention.

The development of high-speed interconnect technologies such as Peripheral Component Interconnect Express (PCIe) and Compute Express Link (CXL) has facilitated the rapid expansion of data-driven applications in cloud computing, artificial intelligence, analytics, edge computing domains, and/or the like. Concurrently, this development has introduced security challenges, notably concerning data integrity and confidentiality.

The Integrity and Data Encryption (IDE) mechanism has been developed to secure encrypted data transmission within these interconnect frameworks. IDE's primary function is to encrypt data packets, specifically Transaction Layer Packets (TLPs), to ensure that information remains secure and unaltered during transmission between different end-point devices within a computing environment. IDE is used to maintain data integrity (assuring that data is accurate and unchanged from its original form) and confidentiality (ensuring that sensitive information remains accessible only to authorized entities). IDE operates by applying cryptographic algorithms to data packets, thus providing a layer of protection against unauthorized access and tampering.

Flit mode and non-flit mode are two distinct modes or formats of data packet transmission within high-speed interconnect technologies, such as PCIe. In flit mode, the data transmission is organized into smaller, flow-controlled units called flow control digits or "flits." Flits are typically used in interconnects that require high efficiency and are capable of handling varying data sizes and traffic conditions. The flit mode is characterized by a packet transmission process that is designed to be more granular and flexible, accommodating a dynamic range of data burst sizes. It is especially suitable for environments with highly variable bandwidth requirements and can help to optimize the utilization of the interconnect's capacity. Non-flit mode, on the other hand, operates without breaking down packets into smaller units. It transmits larger and more static blocks of data, which may be more straightforward but less flexible compared to flit mode. Non-flit mode is often used in scenarios where data traffic is predictable and consistent, allowing for a simpler flow control mechanism.

The current IDE specifications require that data packets, specifically TLPs, maintain uniform transmission modes—either all in flit mode or all in non-flit mode. Current systems necessitate distinct segments or "islands" within the high-speed interconnect fabric that operate exclusively in one transmission mode. This limitation inhibits system flexibility and increases complexity in system architecture.

Data transmission between two endpoints occurs when one end-point device or component sends data to another within a computing system. During this transmission, the data may pass through intermediate devices (e.g., switches) that facilitate and direct the flow of data. Under conventional configurations, when an intermediate device encounters a data packet that requires a change from flit to non-flit mode or vice versa, it performs this translation seamlessly for standard packets. However, for encrypted data packets (or IDE packets), the intermediate device is not conventionally configured to translate between transmission modes. If a switch detects an encrypted data packet requiring mode translation, it will generate an error message indicating its inability to translate the encrypted data packet between flit and non-flit modes.

Embodiments of the invention integrate a novel approach to encrypted data packet transmission by modifying the switch's behavior through the use of IDE capability and control registers. The IDE capability register is an addressable memory location within the switch that signifies its ability to process IDE packets. The IDE capability register holds specific values that inform the intermediate device's logic on whether it can support translation between flit and non-flit modes. By setting different bits in this register, embodiments of the invention can configure the primary and secondary sides of the intermediate device to either flit or non-flit mode, as needed for transmission requirements. The IDE control register, on the other hand, directs the intermediate device's operation regarding encrypted data packet translation. For a type 1 function, which pertains to the intermediate device, different bit settings enable or disable the translation feature. When configured to enable translation, the intermediate device may be configured to convert an encrypted data packet from non-flit to flit mode or vice versa, depending on the direction of data flow and the specific requirements of the packet's destination. By setting the IDE capability and control registers, the ports on the intermediate device may be informed of how to process an encrypted data packet. When these registers are configured to enable translation, the intermediate device recognizes an encrypted data packet and can apply the necessary conversion rules. This process ensures that the packet maintains its encrypted state and integrity while being adapted for the appropriate transmission mode.

In addition to modifying the intermediate device's behavior, embodiments of the invention contemplate a transmission strategy at the source for packet handling in mixed-mode environments. In particular, in the process of preparing a data packet for transmission, the source (e.g., source end-point device) may be configured to initially configure the data packet for non-flit mode data packet transmission. This initial configuration is guided by settings in the IDE Control Register (Offset 08h). For a type 0 function, which pertains to endpoints, the control register may indicate whether translation is universally enabled or selectively enabled based on the communication requirements. Upon configuring the data packet for non-flit mode data packet transmission, the source may be configured to encrypt the data packet. As part of the IDE process, the Message Authentication Code (MAC) may be used to ensure security and integrity of the data packet. The MAC may be a unique signature (e.g., cryptographic checksum) that is generated based on the packet's contents and the encryption key used. The MAC is then appended to the encrypted packet.

Subsequently, the source may be configured to translate the encrypted packet, now with the MAC, from non-flit to flit mode. During the translation, the structure and format of the encrypted data packet may be altered to conform to the requirements of flit mode transmission. However, while the format of the packet and the MAC may change to suit the flit mode, the intrinsic value and the integrity of the MAC may be preserved. Upon translating the encrypted packet, the source may be configured to transmit the packet to a destination. In scenarios where selective stream translation is enabled, as determined by the Selective IDE Stream Control Register, the specific streams subject to translation may be specified for greater control and flexibility in data transmission.

During transit, the encrypted data packet with the MAC may arrive at the intermediate device. The intermediate device may translate the encrypted data packet from flit mode to non-flit mode. After the intermediate device translates the packet into non-flit mode, it may forward the packet towards its intended destination. Upon arrival at the destination, the integrity of the packet can be verified using the MAC. The verification may involve recalculating the MAC based on the received packet's contents and comparing the recalculated MAC with the MAC received in the data packet. If the recalculated MAC aligns with the received MAC, the destination device may confirm that the packet has maintained its integrity throughout transit.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically or optically coupled and/or are in electrical or optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "interconnected" may imply that each component is directly or indirectly linked to every other component or switch in the network, allowing for seamless data transfer and communication between all the components.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description is accurate to within applicable engineering tolerances.

Example System Environment

FIG. 1 illustrates an example system environment 100 for secure data transmission, in accordance with an embodiment of the present invention. In the context of the present invention, the system environment 100, as depicted in FIG. 1, may be configured for the facilitation of secure data transmission through a high-speed interconnect framework or fabric. Specifically, the system environment 100 may utilize a PCIe fabric, a serial computer expansion bus standard, to establish a network of devices (e.g., end-point devices, intermediate devices and/or the like as described in more detail herein) for the purpose of secure data communication. The architecture of the PCIe fabric offers a scalable, point-to-point topology enabling direct, secure communication links between end-point devices, between intermediate devices, and/or between end-point devices and intermediate device. As such, the focus of the invention, in specific embodiments, is on optimizing the secure transmission of data packets within the PCIe fabric by leveraging the inherent architectural advantages of PCIe to provide a robust framework for secure data communication across end-point devices within the system environment 100. FIG. 1 illustrates only one example of an embodiment of the system environment 100, and it will be appreciated that in other embodiments one or more of the systems, units, and/or devices may be combined into a single system, unit, or device or be made up of multiple systems, units, or devices. Furthermore, it is to be understood that reference to the PCIe fabric is illustrative rather than prescriptive. The system environment 100 described need not be limited to PCIe fabric and can accommodate alternative high-speed interconnect technologies. In such cases, the configuration of the system environment 100 may be modified to meet the specific requirements of any chosen high-speed interconnect technology.

As shown in FIG. 1, the system environment 100 may include a plurality of end-point devices 102, 104, 106, 108, an intermediate device 110, and a root complex 105. The plurality of end-point devices 102, 104, 106, 108 may refer to devices that act as terminal points of communication within the PCIe fabric. As such, the plurality of end-point devices 102, 104, 106, 108 may be peripherals that are being connected to the system, such as network cards, graphical processing units (GPUs) network interface cards (NICs), storage controllers/adapters, field programmable gate array (FPGA) accelerators, sound cards/audio interfaces, artificial intelligence (AI)/machine learning (ML) accelerators, and/or the like. In specific embodiments, the plurality of end-point devices 102, 104, 106, 108 may not relay data from other devices; instead, they may either generate or consume data. On the other hand, the intermediate device 110, as shown in FIG. 1, may refer to a switch device within the PCIe fabric, which can route data between different points in the system environment 100, including between multiple end-point devices. As such, the intermediate device 110 may manage the flow of information between the plurality of end-point devices 102, 104, 106, 108 and potentially other components within the system environment 100.

The root complex 105 may be a primary interface within the PCIe fabric that is used to connect peripheral devices, such as the plurality of end-point devices 102, 104, 106, 108 and the intermediate device 110, to the PCIe fabric. The root complex may be configured to manage the communication between external components (e.g., a host processor) and the peripheral devices. The root complex may include root ports 101, 103 that allow the root complex 105 to interface with the peripheral devices, manage a configuration for discovering and configuring peripheral devices, and manage data paths for routing data between the external components and the peripheral devices.

The plurality of end-point devices 102, 104, 106, 108, the intermediate device 110, and the root complex 105 may be operatively coupled via communication links. Each communication link may be configured to operate in at least two distinct modes: flit-based mode and non-flit mode. These modes define the format and management of data transmission over PCIe links, catering to different bandwidth, latency, and data integrity requirements. Flit mode communication links (e.g., communication links 107) may be configured to optimize data transfers for efficiency and reliability, particularly in environments requiring high bandwidth and lower latency. In flit mode, data packets may be divided into smaller units called "flits" (flow control digits). A flit may refer to a basic unit of data transfer in this mode, enabling fine-grained flow control and error checking. This mode is particularly beneficial for applications that require reliable data transmission over long distances within the PCIe fabric. The data format in flit mode may be structured around the efficient handling of these smaller data units. Each flit may include payload data along with header information that includes routing, flow control, and error detection codes.

On the other hand, non-flit mode communication links (e.g., communication links 109) may be configured to transmit data packets as whole units, making this mode simpler but potentially less efficient for certain types of data traffic. Non-flit mode may be suitable for environments where simplicity and compatibility with legacy systems are priorities over the optimized bandwidth and lower latency achievable with flit mode. In non-flit mode, the data format may include larger, intact packets that include payload, header, and trailer (for error checking) data but do not require the segmentation and reassembly processes inherent in flit mode. This mode may be preferred in systems in which data integrity can be sufficiently managed without the granularity provided by flits, or in which the overhead of managing flits would not justify the performance benefits.

Complex PCIe fabric environments, such as the depicted system environment 100, may include communication links with a mix of flit mode 107 and non-flit mode 109 communication links, where communication links connecting components with high throughput and low latency requirements might use flit mode, while connections to legacy or less critical components might use non-flit mode. As shown in FIG. 1, end-point device_A 102 and end-point device_C 106 may be operatively coupled to intermediate device 110 via a flit-mode communication links 107 respectively; end-point device_D 108 may be operatively coupled to the intermediate device 110 via a non-flit mode communication link 109; the root port_B 103 may be operatively coupled to the intermediate device 110 via a non-flit mode communication link 109; and the root port_A 101 may be operatively coupled to the end-point device_B 104 via a non-flit mode communication link 109.

It is to be understood that the structure of the system environment 100 and its components, connections and relationships, and their functions, are meant to be exemplary only, and are not meant to limit implementations of the disclosures described and/or claimed in this document. In one example, the system environment 100 may include more, fewer, or different components. In another example, some or all of the portions of the system environment 100 may be combined into a single portion or all of the portions of the environment 100 may be separated into two or more distinct portions.

Example End-Point Device Circuitry

Figure 2:
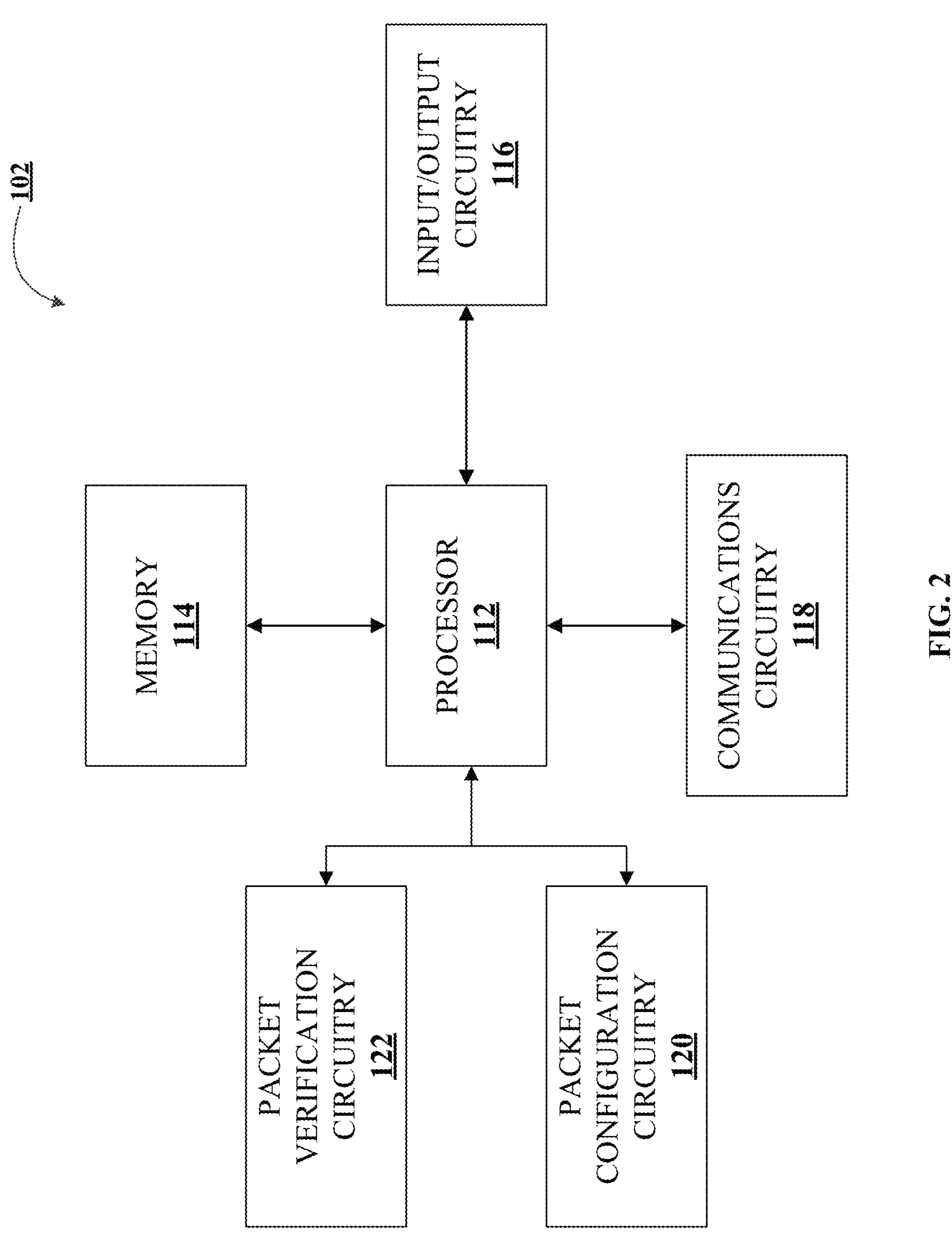
FIG. 2 illustrates example end-point device circuitry for secure data transmission, in accordance with an embodiment of the present invention.

FIG. 2 illustrates example end-point device circuitry 102 for secure data transmission, in accordance with an embodiment of the present invention. As described herein, the plurality of end-point devices 102, 104, 106, 108 may embody the same or substantially similar structural configurations. Therefore, while the ensuing description focuses on the device circuitry of the end-point device_A 102, it is to be understood that other end-point devices (e.g., end-point device_B 104, end-point device_C 106, and/or end-point device_D 108) may possess an analogous or essentially equivalent device circuitry. This parallelism in structure and function among the plurality of end-point devices 102, 104, 106, 108 implies that descriptions, illustrations, and technical details pertaining to the device circuitry of the end-point device_A 102 are equally applicable and representative of the other end-point devices, unless otherwise specified.

As shown in FIG. 2, the end-point device_A 102 may include a processor 112, a memory 114, input/output circuitry 116, communications circuitry 118, packet configuration circuitry 120, and packet verification circuitry 122.

Although the term "circuitry" as used herein with respect to components 112-122 is described in some cases using functional language, it should be understood that the particular implementations necessarily include the use of particular hardware configured to perform the functions associated with the respective circuitry as described herein. It should also be understood that certain of these components 112-122 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the end-point device_A 102 may be housed together, while other components are housed separately (e.g., a controller in communication with the end-point device_A 102). While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the end-point device_A 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the end-point device_A 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the end-point device_A 102, to carry out various functions in accordance with example embodiments of the present disclosure.

Although illustrated in FIG. 2 as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the end-point device_A 102 to carry out various functions in accordance with example embodiments discussed herein. For example, in at least some embodiments, the memory 114 may be configured to buffer data for processing by the processor 112. Additionally, or alternatively, in at least some embodiments, the memory 114 may be configured to store program instructions for execution by the processor 112. The memory 114 may store information in the form of static and/or dynamic information. This stored information may be stored and/or used by the end-point device_A 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, the processor 112 may include a plurality of processors. The plurality of processors may be embodied on a single computing device or may be distributed across a plurality of such devices collectively configured to function as the end-point device_A 102. The plurality of processors may be in operative communication with each other and may be collectively configured to perform one or more functionalities of the end-point device_A 102 as described herein.

In an example embodiment, the processor 112 may be configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor 112 to perform one or more algorithms and/or operations described herein when the instructions are executed. For example, these instructions, when executed by the processor 112, may cause the end-point device_A 102 to perform one or more of the functionalities thereof as described herein.

In some embodiments, the end-point device_A 102 may further include input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a user interface and may include a web user interface, a mobile application, a kiosk, or the like.

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the end-point device_A 102 may be implemented as an end-user machine or other type of device designed for complex user interactions. In some embodiments (like other components discussed herein), the input/output circuitry 116 may be eliminated from the end-point device_A 102. The input/output circuitry 116 may be in communication with memory 114, communications circuitry 118, and/or any other component(s), such as via a bus. Although more than one input/output circuitry and/or other component can be included in the end-point device_A 102, only one is shown in FIG. 2 to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module associated therewith. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more communication ports, network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna (e) or to handle receipt of signals received via the antenna (e). These signals may be transmitted by the end-point device_A 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of the end-point device_A 102, such as via a bus. The communication circuitry 118 of the end-point device_A 102 may also be configured to receive and transmit information to and from the various components associated therewith.

In instances in which end-point device_A 102 is the source of the data packet, the packet configuration circuitry 120 may configure the operational mode or format for data packet transmission, specifically toggling between flit and non-flit modes as required by the transmission parameters for data packet transmission. In addition, the packet configuration circuitry 120 may be configured to encrypt data packets prior to transmission, ensuring the confidentiality and integrity of the data being transmitted. The encryption algorithm employed can be dynamically selected based on the security requirements of the communication, with support for both symmetric and asymmetric encryption methods. Furthermore, the packet configuration circuitry 120 may also be responsible for generating and appending cryptographic checksums or digital signatures (e.g., message authentication code (MAC)) to the packets, thereby providing a mechanism for authentication and non-repudiation. Once configured, the packet configuration circuitry 120 may interface with the processor 112 to initiate transmission of the data packet.

In instances in which end-point device_A 102 is the destination of the data packet, the packet verification circuitry 122 may ensure the authenticity and integrity of received data packets. For example, upon receipt of a data packet, the packet verification circuitry 120 may first extract the MAC appended to the packet by the source end-point device. The packet verification circuitry 122 may then recalculate the MAC for the received packet's components (e.g., headers, payload (if any), and/or the like) using the same cryptographic algorithm and key as the source end-point device. This process allows for the comparison of the recalculated MAC with the extracted MAC. A match between these two MAC values confirms that the data packet has not been altered or tampered with during transmission, thereby verifying the packet's integrity. In instances in which the MAC values do not match, the packet verification circuitry 122 may flag the packet as compromised, indicating a potential integrity or authenticity issue. Here, the packet verification circuitry 122 may interface with the processor 112 to report the verification outcome and to take appropriate actions based on the security policy, such as accepting, rejecting, or flagging the data packets for further inspection.

In some embodiments, the end-point device_A 102 may include hardware, software, firmware, and/or a combination of such components, configured to support various aspects of packet configuration circuitry as described herein. It should be appreciated that in some embodiments, the packet configuration circuitry 120 and/or the packet verification circuitry 122 may perform one or more of such example actions in combination with another circuitry of the end-point device_A 102, such as the memory 114, processor 112, input/output circuitry 116, and/or communications circuitry 118. For example, in some embodiments, the packet configuration circuitry 120 and/or the packet verification circuitry 122 may utilize the processing circuitry, such as the processor 112 and/or the like, to form a self-contained subsystem to perform one or more of its corresponding operations. In a further example, and in some embodiments, some or all of the functionality of the packet configuration circuitry 120 and/or the packet verification circuitry 122 may be performed by the processor 112. In this regard, some or all of the example processes and algorithms discussed herein can be performed by at least one processor 112, the packet configuration circuitry 120 and/or the packet verification circuitry 122. It should also be appreciated that, in some embodiments, the packet configuration circuitry 120 and/or the packet verification circuitry 122 may include a separate processor, specially configured FPGA, or ASIC to perform its corresponding functions.

Additionally, or alternatively, in some embodiments, the packet configuration circuitry 120 and/or the packet verification circuitry 122 may use the memory 114 to store collected information. For example, in some implementations, the packet configuration circuitry 120 and/or the packet verification circuitry 122 may include hardware, software, firmware, and/or a combination thereof, that interacts with the memory 114 to send, retrieve, update, and/or store data.

Accordingly, non-transitory computer readable storage media, which may, for example, be the memory 114, can be configured to store firmware, one or more application programs, and/or other software, which include instructions and/or other computer-readable program code portions that can be executed to direct operation of the end-point device_A 102 to implement various operations, including the examples described herein. As such, a series of computer-readable program code portions may be embodied in one or more computer-program products and can be used, with a device, end-point device_A 102, database, and/or other programmable apparatus, to produce the machine-implemented processes discussed herein. It is also noted that all or some of the information discussed herein can be based on data that is received, generated and/or maintained by one or more components of the end-point device_A 102. In some embodiments, one or more external systems (such as a remote cloud computing and/or data storage system) may also be leveraged to provide at least some of the functionality discussed herein.

It should be recognized that the structure of the end-point device_A 102, as detailed herein, represents merely one embodiment among a multitude of potential configurations. This particular structure of the end-point device_A 102 is delineated to demonstrate a specific arrangement and interaction of its components—encompassing data processing units, network interfaces, and packet configuration circuitry—that collectively contribute to its comprehensive network capabilities. However, this outlined configuration is not definitive or limiting. The structure of the end-point device_A 102 and its integral components can be varied to adapt to different networking paradigms, technological evolutions, and specific application needs. Alternative embodiments of the end-point device_A 102 might employ varying types of processors, such as advanced multi-core CPUs or specialized GPUs, distinct networking interfaces like SmartNICs or advanced wireless modules, and diverse methods for managing network events and communications. Moreover, the scalability, data handling techniques, and network integration approaches of the end-point device_A 102 can substantially differ based on targeted operational environments and functional requisites. Thus, while the present disclosure depicts one potential structure for the end-point device_A 102, it is to be understood that this represents just one exemplification within the broader realm of network-enabled devices. The scope of the invention is, therefore, not confined to this singular form but is extendable to various other forms, technologies, and configurations.

Figure 3:
FIG. 3 illustrates an example method for configuring a data packet for secure data transmission at an end-point device, in accordance with an embodiment of the invention.
Figure 3:
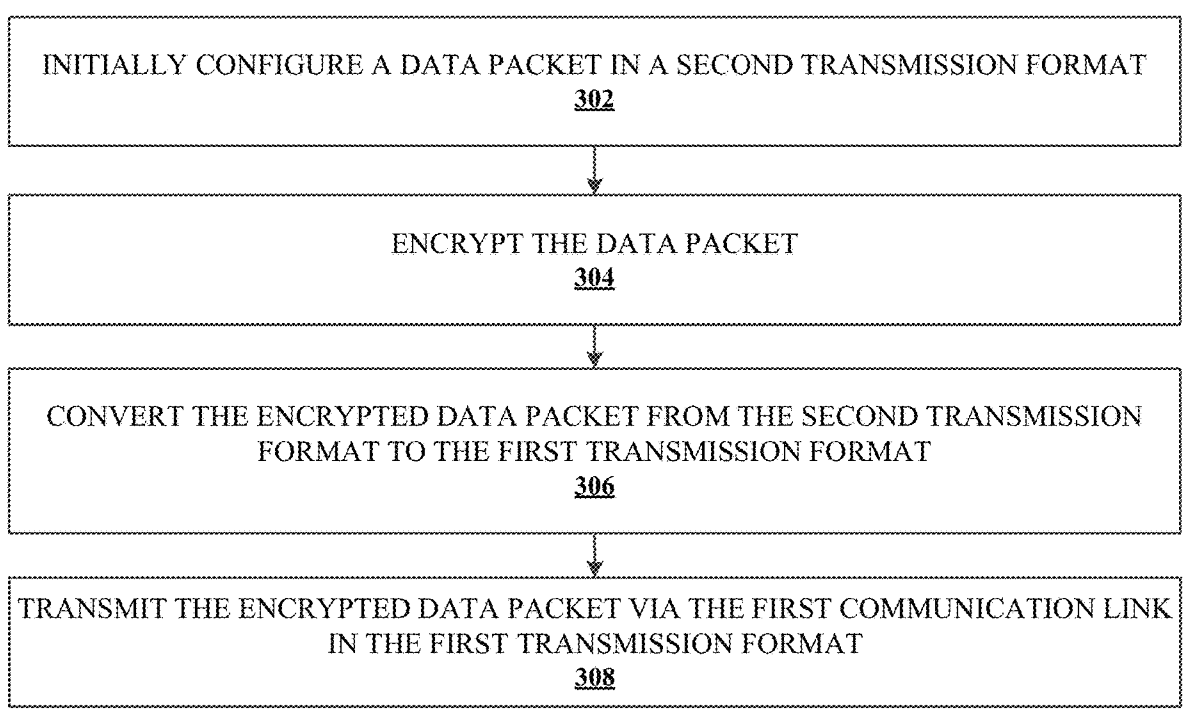

Example Method for Configuring a Data Packet for Secure Data Transmission at an End-Point Device FIG. 3 illustrates an example method for configuring a data packet for secure data transmission at an end-point device (e.g., a first end-point device), in accordance with an embodiment of the invention. With reference to FIGS. 1 and 3, the data packet may be a transport layer packet (TLP), used for transferring data and commands between end-point devices within the PCIe fabric. As described herein, complex PCIe fabric environments, such as system environment 100 as shown in FIG. 1, may include communication links that facilitate transmission of data in different formats. As such, the first end-point device, when configuring the data packet for transmission, determines the characteristics of each communication link in the data packet's route from source (e.g., first end-point device) to destination (e.g., second end-point device). This may include determining whether a communication link is configured for a first transmission format (e.g., flit mode, which is preferred for high-speed, low-latency transmissions), or for a second transmission format (e.g., non-flit mode, suitable for less urgent data transfers). Based on determining the characteristics of each communication link, the first end-point device may configure the data packet for transmission accordingly.

For example, the first end-point device may be end-point device_A 102 (as shown in FIG. 1) and the second end-point device may be end-point device_B 104 (as shown in FIG. 1). For a data packet transmitted by end-point device_A 102 to reach end-point device_B 104, it may traverse intermediate device 110 (as shown in FIG. 1), arrive at the root complex 105 (as shown in FIG. 1) via root port_B 103 (as shown in FIG. 1), and may reach end-point_B 104 via root port_A 101 (as shown in FIG. 1). As shown in FIG. 1, the data packet's route from end-point device_A 102 to end-point device_B 104 may include communication links that facilitate transmission of data in both flit mode and non-flit mode. For example, the communication link between the end-point device_A 102 and the intermediate device 110 may facilitate transmission of data in a first transmission format (e.g., flit mode), while the communication link between the intermediate device 110 and the root port_B 103, as well as the communication link between the root port_A 101 and the end-point device_B 104, may facilitate transmission of data in a second transmission format (e.g., non-flit mode). Because the destination—the second end-point device (e.g., the end-point device_B 102) in this example—may receive the data packet via a communication link that facilitates the transmission of data in the second transmission format, the source-first end-point device (e.g., the end-point device_A 104) in this example—may initially configure the data packet in the second transmission format. In specific embodiments, even if the second end-point device receives the data packet via a communication link that facilitates the transmission of data in the first communication format, the source—first end-point device may still initially configure the data packet in the second transmission format. Accordingly, as shown in block 302 of FIG. 3, the method may initially configure a data packet in a second transmission format.

Upon initially configuring the data packet in the second transmission format, the method may further encrypt the data packet, as shown in block 304, such as by using an integrity and data encryption (IDE) mechanism. The IDE mechanism may be a comprehensive security protocol designed to safeguard data integrity and confidentiality during transmission. This mechanism may employ a variety of encryption algorithms, such as Advanced Encryption Standard (AES) and Rivest-Shamir-Adleman (RSA), to encode data into a format that can only be read by the intended recipient. The encryption algorithms may be implemented using encryption keys that function as the secure medium through which the data is locked by the sender and unlocked by the recipient. The choice of encryption algorithm and the corresponding key length may directly influence the security level of the transmitted data; for instance, AES might be used with key sizes of 128, 192, or 256 bits, each offering a progressively higher security level.

In addition to encrypting the data packet using IDE mechanism, a message authentication code (MAC) (e.g., transmitted MAC) may be generated for the encrypted data packet. The MAC may serve as a verification tool, ensuring that the data received matches the data that was sent, without any modifications. In specific embodiments, the MAC may be generated based on the packet components (e.g., header, payload (if any), trailer, and/or the like) associated with the data packet and an encryption key from the IDE mechanism. The MAC may then be appended to the encrypted data packet. By appending the MAC to the encrypted data packet, the method may ensure that any tampering or alteration of the data during transmission can be detected, thereby maintaining the data's authenticity and integrity.

As shown in block 306, the method may convert the encrypted data packet from the second transmission format to the first transmission format. Following the initial configuration of the encrypted data packet in the second transmission format, the method may convert the encrypted data packet from the second transmission format to the first transmission format to accommodate the specific requirements of the communication link characteristics. Given that the communication link 107 between the first end-point device (e.g., the end-point device_A 102) and the intermediate device (e.g., intermediate device 110) facilitates data transmission in the first transmission format (e.g., flit mode), the encrypted data packet may be converted accordingly prior to transmission to the intermediate device. In specific embodiments, when converting the encrypted data packet, the transmitted MAC embedded within the encrypted data packet may also be converted to the first transmission format. Despite the conversion of the transmitted MAC to the first transmission format, the intrinsic value of the MAC itself may remain unchanged; only its format is altered to meet the specifications required for transmission over the communication link 107 between the first end-point device (e.g., end-point device_A 102) and the intermediate device (e.g., intermediate device 110). In other embodiments, when converting the encrypted data packet, the transmitted MAC embedded within the encrypted data packet may remain the same.

As shown in block 308, the method may transmit the encrypted data packet via the first communication link in the first transmission format. Specifically, the encrypted data packet, in the first transmission format, is transmitted to the intermediate device through the first communication link (e.g., the communication link 107 in FIG. 1 in this example).

In some embodiments, the first end-point device may configure the data packet as described herein regardless of the specific characteristics of the communication links in the data packet's route from the first end-point device to the second end-point device. In instances in which the communication channel between the first end-point device and the second end-point device exclusively supports non-flit mode transmission (e.g., second transmission format), the first end-point device may still configure the data packet for transmission in flit mode (e.g., first transmission format). In such cases, the transmitted data packet continues to traverse the communication link. However, certain advantages inherent to flit mode, such as potentially higher efficiency and adaptability to variable bandwidth, may not be fully realized.

Figure 4:
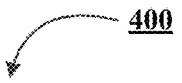
FIG. 4 illustrates an example method for re-configuring a data packet at an intermediate device for end-point routing, in accordance with an embodiment of the invention.
Figure 4:
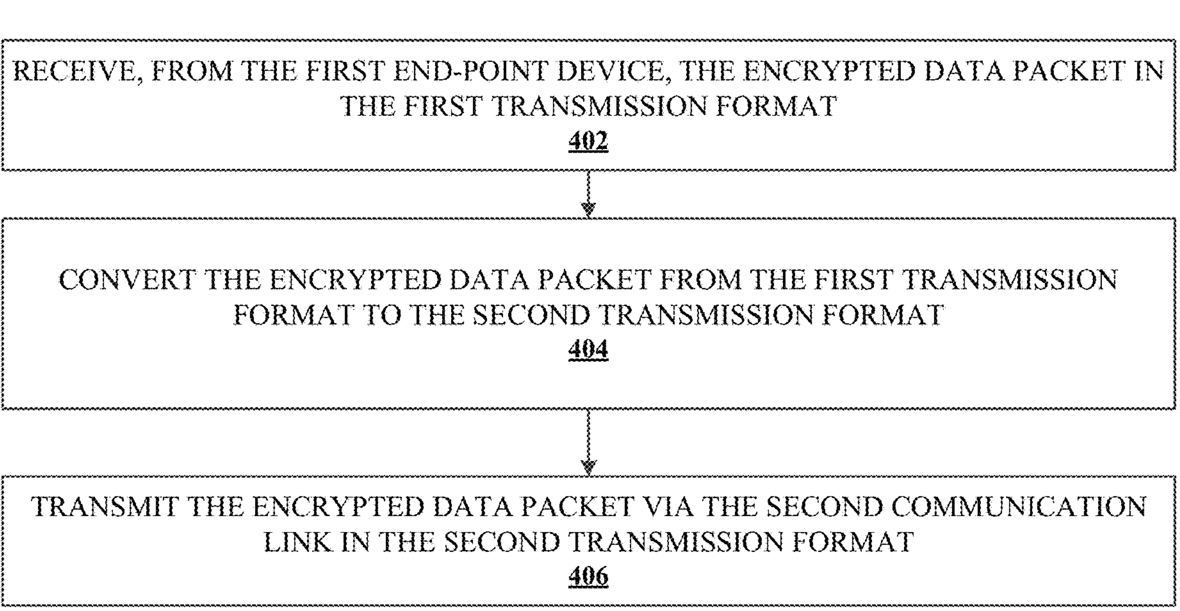

Example Method for Re-Configuring a Data Packet at an Intermediate Device for End-Point Routing FIG. 4 illustrates an example method for re-configuring a data packet at an intermediate device for end-point routing, in accordance with an embodiment of the invention. As shown in block 402, the method may receive, from the first end-point device (e.g., the end-point device_A 102 in FIG. 1), the encrypted data packet in the first transmission format. As described herein, the intermediate device (e.g., the intermediate device 110 in FIG. 1) may be a switch configured to manage and facilitate the flow of data between various components (e.g., devices) of the system. As such, the intermediate device may act as a router that directs the flow of data packets between end-point devices.

As shown in block 404, the method may convert the encrypted data packet from the first transmission format to the second transmission format. As described herein, in conventional implementations, intermediate devices (e.g., switches) are typically not equipped to translate between different transmission formats for data packets encrypted using the IDE mechanism. Should a conventional intermediate device encounter an encrypted data packet that necessitates a shift from one transmission mode to another, the conventional intermediate device would generate an error message, signaling its inability to perform the conversion between flit mode and non-flit mode for the encrypted data packet (according to the previous example). To overcome these limitations, the intermediate device according to embodiments of the invention (e.g., the intermediate device 110) may be configured to handle the conversion of encrypted data packets from the first transmission format to the second transmission format (or vice versa, as dictated by the data path) automatically.

Specifically, the IDE capability and control registers of the intermediate device may be configured such that the intermediate device may determine a need for format translation (e.g., converting the encrypted data packet from the first transmission format to the second transmission format) and automatically convert the encrypted data packet. IDE capability registers may be specialized memory locations within PCIe devices, such as intermediate devices or end-point devices, that indicate the device's support for processing encrypted data packets. The IDE capability registers may store information that communicate a device's ability to handle encrypted data according to the IDE protocol. This may include the device's support for encryption algorithms, device's key management, and device's ability to translate encrypted data packets between different transmission formats if necessary. By setting different bits in this register, the primary (e.g., receiving) and secondary (e.g., transmitting) sides of the intermediate device may be configured to operate in either the first transmission format or the second transmission format, as needed for transmission requirements.

IDE control registers, on the other hand, may be used to manage the actual operation of encryption and decryption processes, including by allowing the system or device to enable or disable encryption, select encryption keys, manage key exchange, and set operational parameters for how encrypted data should be handled. In other words, control registers actively manage the encryption lifecycle and dictate how the device processes encrypted data. Functions within an intermediate device may be categorized into two primary types: type 0 and type 1. A type 1 function may apply to intermediate devices that manage the flow of data between different components of the PCIe fabric. The configuration space of a type 1 function may include registers that can be programmed to control various operational parameters, including the ability to translate data transmission formats, such as from non-flit to flit mode and vice versa. By setting the IDE capability and control registers, the ports on the intermediate device may be informed of how to process the encrypted data packet. When these registers are configured to enable translation, the intermediate device may recognize an encrypted data packet, determine a need for format translation, and apply the necessary conversion rules.

As shown in block 406, the method may transmit the encrypted data packet via the second communication link in the second transmission format. Specifically, the encrypted data packet, in the second transmission format, is transmitted to the root complex, specifically root_port B 103 as shown in FIG. 1, through the second communication link.

Figure 5:
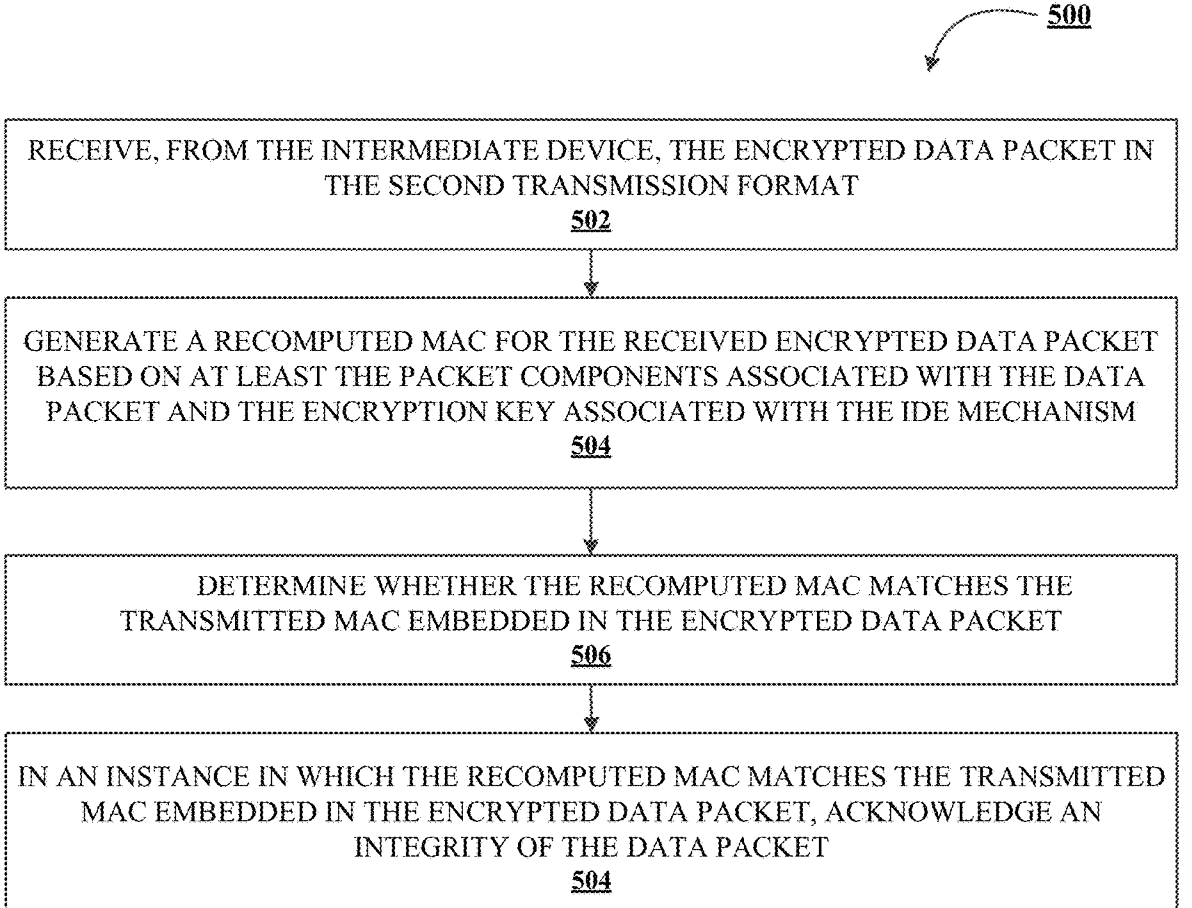
FIG. 5 illustrates an example method for verifying an integrity of the data packet at an end-point device, in accordance with an embodiment of the invention.

Example Method for Verifying an Integrity of the Data Packet at an End-Point Device FIG. 5 illustrates an example method for verifying an integrity of the data packet at an end-point device, in accordance with an embodiment of the invention. As shown in block 502, the method may receive, from the intermediate device (e.g., the intermediate device 110 in FIG. 1) the encrypted data packet in the second transmission format. When the encrypted data packet arrives at a destination (e.g., the second end-point device), the destination end-point device may be configured to initiate a process to decrypt and verify the integrity of the data in the data packet. In the example shown in FIG. 1, the second end-point device (e.g., the end-point device_B 104) may receive the encrypted data packet from the root complex 105 via the root complex port_A 101. The transmission format of the communication link 109 between the intermediate device 110 and the root port_B 103 may be identical to the transmission format of the communication link 109 between root port_A 101 and the end-point device_B 104 (the second transmission format in this example). Therefore, no additional translation may be required for the encrypted data packet. Upon successful decryption, the second end-point device may then examine the transmitted MAC that was appended to the encrypted data packet prior to its transmission.

As shown in block 504, the method may generate a MAC (e.g., recomputed MAC) for the received encrypted data packet based on at least the packet components associated with the data packet and the encryption key associated with the IDE mechanism. To examine the transmitted MAC, the second end-point device may compute its own MAC (e.g., a recomputed MAC) based on the received data and the shared secret encryption key used during the encryption process.

As shown in block 508, the method may determine whether the recomputed MAC matches the transmitted MAC embedded in the encrypted data packet. Upon generating the recomputed MAC, the second end-point device may compare the recomputed MAC with the transmitted MAC embedded within the encrypted data packet. If the two MACs match, the second end-point device may confirm that the data's integrity has been preserved, and the packet is authenticated as genuine and untampered.

As shown in block 510, the method may acknowledge an integrity of the data packet in an instance in which the recomputed MAC matches the transmitted MAC embedded in the encrypted data packet. Upon verifying the integrity of the data packet, the second end-point device may transmit an acknowledgement to the source (e.g., the first end-point device) indicating that the data packet was successfully received and verified.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases the method may include additional steps. The steps and modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:

a first end-point device comprising a circuitry configured to configure a data packet for transmission by:

initially configuring the data packet in a second transmission format associated with a second communication link, wherein the second transmission format is different from a first transmission format associated with a first communication link coupled to the first end-point device;

encrypting the data packet while the data packet is configured in the second transmission format to generate an encrypted data packet and an integrity signature specifically valid for the second transmission format;

converting the encrypted data packet from the second transmission format to the first transmission format; and transmitting the encrypted data packet via the first communication link;

an intermediate device operatively coupled to the first end-point device via the first communication link, wherein the intermediate device comprises circuitry configured to:

receive the encrypted data packet in the first transmission format;

re-configure the encrypted data packet from the first transmission format to the second transmission format; and transmit the re-configured encrypted data packet via the second communication link in the second transmission format; and a second end-point device operatively coupled to the intermediate device via the second communication link, wherein the second end-point device is configured to:

receive the re-configured encrypted data packet in the second transmission format; and process the re-configured encrypted data packet using the integrity signature generated by the first end-point device.

2. The system of claim 1, wherein the first end-point device is further configured to:

determine that the first communication link is configured to facilitate data transmission in the first transmission format and the second communication link is configured to facilitate data transmission in the second transmission format.

3. The system of claim 2, wherein the first transmission format is flit mode format, and the second transmission format is a non-flit mode format.

4. The system of claim 2, wherein the first end-point device is configured to encrypt the data packet while the data packet is configured in the second transmission format using an integrity and data encryption (IDE) mechanism.

5. The system of claim 4, wherein the first end-point device, in encrypting the data packet, is further configured to:

generate the integrity signature that includes a transmitted message authentication code (MAC) for the encrypted data packet based on at least packet components associated with the data packet and an encryption key associated with the IDE mechanism; and embed the transmitted MAC within the encrypted data packet.

6. The system of claim 5, wherein the first end-point device, in converting the encrypted data packet, is further configured to:

convert the transmitted MAC embedded within the encrypted packet from the second transmission format to the first transmission format.

7. The system of claim 5, wherein the intermediate device, in re-configuring the data packet for transmission, is further configured to:

convert the encrypted data packet from the first transmission format to the second transmission format; and transmit the encrypted data packet via the second communication link in the second transmission format.

8. The system of claim 7, wherein the intermediate device, in converting the encrypted packet, is further configured to:

convert the transmitted MAC embedded within the encrypted packet from the first transmission format to the second transmission format.

9. The system of claim 7, wherein the second end-point device is further configured to:

process the re-configured encrypted data packet using the integrity signature by generating a recomputed MAC for the received re-configured encrypted data packet based on at least the packet components associated with the data packet and the encryption key associated with the IDE mechanism;

determine whether the recomputed MAC matches the transmitted MAC embedded in the encrypted data packet; and in an instance in which the recomputed MAC matches the transmitted MAC embedded in the encrypted data packet, acknowledge an integrity of the data packet.

10. The system of claim 1, wherein the first communication link and the second communication link are associated with high-speed interconnect technologies, and wherein the data packet is a transport layer packet (TLP).

11. A method for configuring a data packet, the method comprising:

initially configuring, by a first end-point device, a data packet in a second transmission format associated with a second communication link, wherein the second transmission format is different from a first transmission format associated with a first communication link coupled to the first end-point device;

encrypting, by the first end-point device, the data packet while the data packet is configured in the second transmission format to generate an encrypted data packet and an integrity signature specifically valid for the second transmission format;

converting, by the first end-point device, the encrypted data packet from the second transmission format to the first transmission format; and transmitting, by the first end-point device, the encrypted data packet via the first communication link in the first transmission format.

12. The method of claim 11, wherein the first transmission format is flit mode format, and the second transmission format is a non-flit mode format.

13. The method of claim 11, wherein the data packet is encrypted using an integrity and data encryption (IDE) mechanism.

14. The method of claim 13, wherein encrypting the data packet further comprises:

generating, by the first end-point device, the integrity signature that comprises a transmitted message authentication code (MAC) for the encrypted data packet based on at least packet components associated with the data packet and an encryption key associated with the IDE mechanism; and embedding, by the first end-point device, the transmitted MAC within the encrypted data packet.

15. The method of claim 14, wherein converting the encrypted data packet further comprises:

convert, by the first end-point device, the transmitted MAC embedded within the encrypted packet from the second transmission format to the first transmission format.

16. A computer program product for configuring a data packet, the computer program product comprising a non-transitory computer-readable medium comprising instructions, when executed by a processor, cause a first end-point device to:

initially configure a data packet in a second transmission format associated with a second communication link, wherein the second transmission format is different from a first transmission format associated with a first communication link coupled to the first end-point device;

encrypt the data packet while the data packet is configured in the second transmission format to generate an encrypted data packet and an integrity signature specifically valid for the second transmission format;

convert the encrypted data packet from the second transmission format to the first transmission format; and transmit the encrypted data packet via the first communication link in the first transmission format.

17. The computer program product of claim 16, wherein the first transmission format is flit mode format, and the second transmission format is a non-flit mode format.

18. The computer program product of claim 16, wherein the instructions to encrypt the data packet, when executed by a processor, cause the first end-point device to encrypt the data packet using an integrity and data encryption (IDE) mechanism.

19. The computer program product of claim 18, wherein the instructions to encrypt the data packet, when executed by a processor, cause the first end-point device to:

generate the integrity signature that comprises a transmitted message authentication code (MAC) for the encrypted data packet based on at least a packet components associated with the data packet and an encryption key associated with the IDE mechanism; and embed the transmitted MAC within the encrypted data packet.

20. The computer program product of claim 19, wherein the instructions to convert the encrypted data packet, when executed by a processor, cause the first end-point device, device to:

convert the transmitted MAC embedded within the encrypted packet from the second transmission format to the first transmission format.

* * * * *